United States Patent
Fang et al.

(10) Patent No.: US 11,229,052 B2
(45) Date of Patent: Jan. 18, 2022

(54) PROCESSES AND METHODS TO ENABLE DOWNLINK DATA TRANSMISSION OVER WIDE BANDWIDTH FOR THE CELL EDGE STATION

(71) Applicant: INTEL CORPORATION, Santa Clara, CA (US)

(72) Inventors: Juan Fang, Hillsboro, OR (US); Minyoung Park, Portland, OR (US); Shahrnaz Azizi, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 7 days.

(21) Appl. No.: 16/488,022

(22) PCT Filed: Mar. 28, 2017

(86) PCT No.: PCT/US2017/024454
§ 371 (c)(1),
(2) Date: Aug. 22, 2019

(87) PCT Pub. No.: WO2018/182574
PCT Pub. Date: Oct. 4, 2018

(65) Prior Publication Data
US 2020/0068613 A1    Feb. 27, 2020

(51) Int. Cl.
*H04W 40/24*    (2009.01)
*H04W 74/08*    (2009.01)
(Continued)

(52) U.S. Cl.
CPC ....... *H04W 74/0808* (2013.01); *H04L 1/1621* (2013.01); *H04W 4/80* (2018.02); *H04W 72/0446* (2013.01); *H04W 88/10* (2013.01)

(58) Field of Classification Search
CPC .. H04L 1/1621; H04W 4/80; H04W 72/0446; H04W 74/0808; H04W 74/0816; H04W 84/12; H04W 88/10
See application file for complete search history.

(56) References Cited

U.S. PATENT DOCUMENTS

| 10,743,295 B2* | 8/2020 | Pang | H04W 72/0406 |
| 2010/0290421 A1* | 11/2010 | Morioka | H04W 84/18 370/329 |

(Continued)

FOREIGN PATENT DOCUMENTS

WO   WO 2016/006867   1/2016

OTHER PUBLICATIONS

3GPP TSG-RAN WG1 Meeting # 80; Ericsson "Uplink Coverage Evaluation for Small Data Applications" Athens, Greece, Feb. 9-13, 2015; R1-150331.
(Continued)

*Primary Examiner* — Phuc H Tran
(74) *Attorney, Agent, or Firm* — Schwegman Lundberg & Woessner, P.A.

(57) ABSTRACT

Methods and systems herein provide better downlink (DL) data throughput for cell-edge stations (CE STAs). The systems enable protection from a third-party collision during a wideband DL data transmission to the cell edge STA, when the wideband control frame, such as clear-to-send (CTS) or acknowledge (ACK), transmission from a cell edge STA cannot reach the AP. This process can be achieved by designing a new wideband control frame comprising: a legacy preamble sent over the primary 20 MHz channel that can be decoded by the legacy STAs, a new preamble sent over the primary 20 MHz channel that can be used to identify the new wideband control frame (this new preamble has the total signal bandwidth information for the rest of the packet following the new preamble); and duplicate legacy (Continued)

control packets set over the total bandwidth indicated in the new preamble (the legacy control packets can be decoded by the legacy STAs).

18 Claims, 11 Drawing Sheets

(51) Int. Cl.
  *H04W 4/80* (2018.01)
  *H04L 1/16* (2006.01)
  *H04W 72/04* (2009.01)
  *H04W 88/10* (2009.01)

(56) References Cited

U.S. PATENT DOCUMENTS

| | | | | |
|---|---|---|---|---|
| 2012/0327870 | A1* | 12/2012 | Grandhi | H04W 74/0816 370/329 |
| 2015/0358067 | A1* | 12/2015 | Zhang | H04B 7/15507 370/315 |
| 2016/0128004 | A1 | 5/2016 | Lee et al. | |
| 2016/0165601 | A1 | 6/2016 | Noh et al. | |
| 2016/0295610 | A1 | 10/2016 | Grandhi et al. | |
| 2017/0202019 | A1 | 7/2017 | You et al. | |
| 2017/0290057 | A1* | 10/2017 | Fang | H04B 7/15542 |
| 2018/0184402 | A1* | 6/2018 | Cariou | H04W 76/15 |
| 2019/0110227 | A1* | 4/2019 | Lepp | H04W 52/367 |
| 2019/0306920 | A1* | 10/2019 | Son | H04W 74/004 |
| 2020/0053674 | A1* | 2/2020 | Wei | H04L 5/0048 |
| 2020/0245241 | A1* | 7/2020 | Nishio | H04L 1/0061 |

OTHER PUBLICATIONS

International Search Report for International Application No. PCT/US2017/024454, dated Dec. 17, 2017.

Written Opinion for International Application No. PCT/US2017/024454, dated Dec. 17, 2017.

International Preliminary Report on Patentability for International Application No. PCT/US2017/024454, dated Oct. 10, 2019.

* cited by examiner

PROCESSES AND METHODS TO ENABLE DOWNLINK DATA TRANSMISSION OVER WIDE BANDWIDTH FOR THE CELL EDGE STATION

CROSS REFERENCE TO RELATED APPLICATIONS

This application is a national stage application under 35 U.S.C 371 of PCT Application No. PCT/US2017/024454, filed 28 Mar. 2017, which designated the United States, which PCT application is incorporated herein by reference in its entirety.

TECHNICAL FIELD

An exemplary aspect is directed toward communications systems. More specifically an exemplary aspect is directed toward wireless communications systems and even more specifically to IEEE (Institute of Electrical and Electronics Engineers) 802.11 wireless communications systems. Even more specifically, exemplary aspects are at least directed toward one or more of IEEE (Institute of Electrical and Electronics Engineers) 802.11n/ac/ax/ad/ay . . . communications systems and in general any wireless communications system or protocol, such as 4G, 4G LTE, 5G and later, and the like.

BACKGROUND

Wireless networks transmit and receive information utilizing varying techniques and protocols. For example, but not by way of limitation, two common and widely adopted techniques used for communication are those that adhere to the Institute for Electronic and Electrical Engineers (IEEE) 802.11 standards such as the IEEE 802.11n standard, the IEEE 802.11ac standard and the IEEE 802.11ax standard.

The IEEE 802.11 standards specify a common Medium Access Control (MAC) Layer which provides a variety of functions that support the operation of IEEE 802.11-based Wireless LANs (WLANs) and devices. The MAC Layer manages and maintains communications between IEEE 802.11 stations (such as between radio network interface cards (NIC) in a PC or other wireless device(s) or stations (STA) and access points (APs)) by coordinating access to a shared radio channel and utilizing protocols that enhance communications over a wireless medium.

IEEE 802.11ax is the successor to IEEE 802.11ac and is proposed to increase the efficiency of WLAN networks, especially in high density areas like public hotspots and other dense traffic areas. IEEE 802.11ax also uses orthogonal frequency-division multiple access (OFDMA), and related to IEEE 802.11ax, the High Efficiency WLAN Study Group (HEW SG) within the IEEE 802.11 working group is considering improvements to spectrum efficiency to enhance system throughput/area in high density scenarios of APs (Access Points) and/or STAs (Stations).

IEEE 802.11ac supports high physical data rate using a wider channel bandwidth (i.e. 80 MHz or optionally 160 MHz). However, due to the propagation loss, a STA at the edge of the coverage area of a basic service set (BSS) cannot support 80 MHz transmission/reception. Therefore, the physical data rate to a cell-edge STA (CE STA) can be much lower than that to the non-cell-edge STA (non-CE STA). For example, in an environment with four access points (APs) located at the four corners of a large 40 m×40 m room, a STA will follow the rules defined in IEEE 802.11 specification to connect with the nearest AP. The physical data rate to the STA in the middle of the room is much lower than that for a second STA near one of the four corners, where the STA is closer to the AP.

Further, to save power, the transmit power of the battery STA can be much lower than that of the AP. As a result, when the STA is in the 80 MHz transmission range of the AP, the AP may be only in the 20 MHz transmission range of the STA. In deployment scenarios where collision protection through use of request-to-send/clear-to-send (RTS/CTS) is needed, the AP can transmit duplicate RTSs in the primary channel and secondary channels, and the intended STA can transmit duplicate CTSs in primary and secondary channels. However, if the 80 MHz transmission range of the STA is limited, even if the STA supports wide bandwidth transmission, the STA's wideband CTSs will not reach the AP, and thus, the AP will not send 80 MHz downlink (DL) data packets to the STA. Usually, wider channel bandwidth can provide higher data rate than narrow channel bandwidth with the same transmit power.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DESCRIPTION OF EMBODIMENTS

Figure 1A:
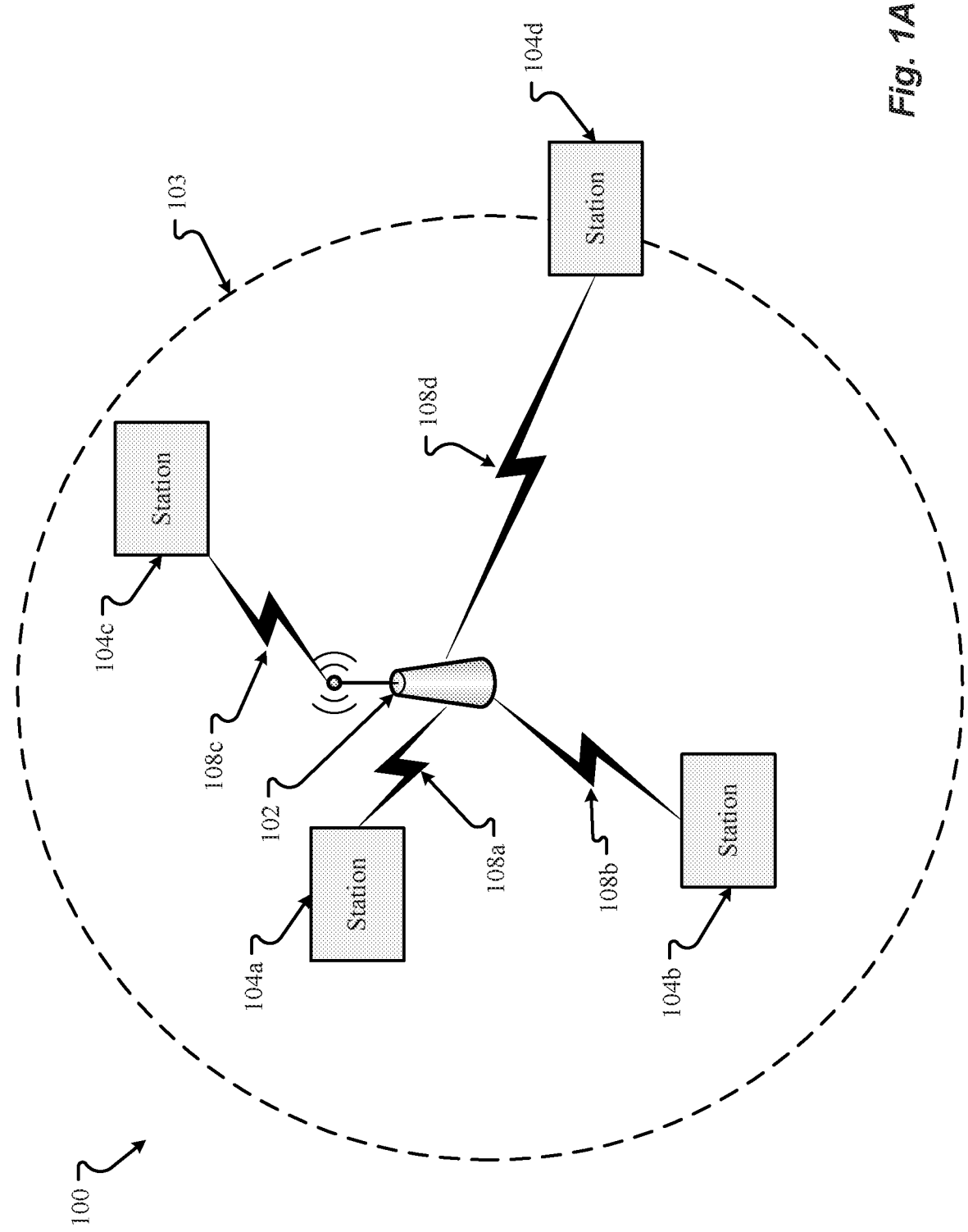
FIG. 1A illustrates an embodiment of an environment having a CE STA.

The embodiments presented herein provide better uplink and downlink data throughput for CE STAs. To improve the DL performance of the CE STA, the embodiments herein enable DL data transmission to the CE STA over wide channel bandwidth without increasing the transmit power of the device. The novel concept is to enable protection from a third party collision during a wideband DL data transmission to the cell edge STA, when the wideband control frame, such as CTS or acknowledge (ACK), transmission from a cell edge STA cannot reach the AP. This process can be achieved by designing a new wideband control frame comprising: a legacy preamble sent over the primary 20 MHz channel that can be decoded by the legacy STAs, a new preamble sent over the primary 20 MHz channel that can be used to identify the new wideband control frame (this new preamble has the total signal bandwidth information for the rest of the packet following the new preamble); and duplicate legacy control packets set over the total bandwidth indicated in the new preamble (the legacy control packets can be decoded by the legacy STAs).

Some embodiments may involve wireless communications according to one or more other wireless communication standards. Examples of other wireless communications technologies and/or standards that may be used in various embodiments may include—without limitation—other IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11ad, IEEE 802.11af, IEEE 802.11ah, IEEE 802.11ax, and/or IEEE 802.11ay standards, Wi-Fi Alliance (WFA) wireless communication standards, such as, Wi-Fi, Wi-Fi Direct, Wi-Fi Direct Services, Wireless Gigabit (WiGig), WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) standards such as those embodied in 3GPP Technical Report (TR) 23.887, 3GPP Technical Specification (TS) 22.368, and/or 3GPP TS 23.682, and/or near-field communication (NFC) standards such as standards developed by the NFC Forum, including any predecessors, revisions, progeny, and/or variants of any of the above.

Some embodiments may involve wireless communications performed according to one or more broadband wireless communication standards. For example, various embodiments may involve wireless communications performed according to one or more 3rd Generation Partnership Project (3GPP), 3GPP Long Term Evolution (LTE), and/or 3GPP LTE-Advanced (LTE-A) technologies and/or standards, including their predecessors, revisions, progeny, and/or variants. Additional examples of broadband wireless communication technologies/standards that may be utilized in some embodiments may include—without limitation— Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS), IEEE 802.16 wireless broadband standards such as IEEE 802.16m and/or IEEE 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1×RTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their predecessors, revisions, progeny, and/or variants.

FIG. 1 illustrates an example of an operating environment 100 which may be representative of various configurations described herein. The WLAN 103 may comprise a basic service set (BSS) that may include a master station 102 and one or more other stations (STAs) 104. The master station 102 may be an access point (AP) using the IEEE 802.11 to transmit and receive. Hereinafter, the term AP will be used to identify the master station 102. The AP 102 may be a base station and may use other communications protocols as well as the IEEE 802.11 protocol. The IEEE 802.11 protocol may be the IEEE 802.11ax or later standard. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO).

The STAs 104 may include one or more high-efficiency wireless (HEW) (as illustrated in, e.g., the IEEE 802.11ax standard) STAs 104 a, b, d and/or one or more legacy (as illustrated in, e.g., the IEEE 802.11n/ac standards) STAs 104c. The legacy STAs 104c may operate in accordance with one or more of IEEE 802.11 a/b/g/n/ac/ad/af/ah/aj, or another legacy wireless communication standard. The HEW STAs 104 a, b, d may be wireless transmit and receive devices, for example, a cellular telephone, a smart telephone, a handheld wireless device, wireless glasses, a wireless watch, a wireless personal device, a tablet, or another device that may be transmitting and receiving using a IEEE 802.11 protocol, for example, the IEEE 802.11ax or another current or future wireless protocol. In the operating environment 100, an AP 102 may generally manage access to the wireless medium in the WLAN 103.

Within the environment 100, one or more STAs 104a, 104b, 104c, 104d may associate and/or communicate with the AP 102 to join the WLAN 103. Joining the WLAN 103 may enable STAs 104a-104d to wirelessly communicate with each other via the AP 102, with each other directly, with the AP 102, or to another network or resource through the AP 102. In some configurations, to send data to a recipient (e.g., STA 104a), a sending STA (e.g., STA 104b) may transmit an uplink (UL) physical layer convergence procedure (PLCP) protocol data unit (PPDU) comprising the data to AP 102, which may then send the data to the recipient STA 104a, in a downlink (DL) PPDU.

In some configurations, a frame of data transmitted between the STAs 104 or between a STA 104 and the AP 102 may be configurable. For example, a channel used in for communication may be divided into subchannels that may be 20 MHz, 40 MHz, or 80 MHz, 160 MHz, 320 MHz of contiguous bandwidth or an 80+80 MHz (160 MHz) of non-contiguous bandwidth. Further, the bandwidth of a subchannel may be incremented into 1 MHz, 1.25 MHz, 2.03 MHz, 2.5 MHz, 5 MHz and 10 MHz bandwidths, or a combination thereof, or another bandwidth division that is less or equal to the available bandwidth may also be used. The bandwidth of the subchannels may be based on a number of active subcarriers. The bandwidth of the subchannels can be multiples of 26 (e.g., 26, 52, 104, etc.) active subcarriers or tones that are spaced by 20 MHz. In some configurations, the bandwidth of the subchannels is 256 tones spaced by 20 MHz. In other configurations, the subchannels are a multiple of 26 tones or a multiple of 20 MHz. A 20 MHz subchannel may also comprise 256 tones for use with a 256 point Fast Fourier Transform (FFT).

At a given point in time, multiple STAs 104a-d, in the WLAN 103, may wish to send data. In some configurations, rather than scheduling medium access for STAs 104a-d in different respective UL time intervals, the AP 102 may schedule medium access for STAs 104a-d to support UL multi-user (MU) transmission techniques, according to which multiple STAs 104*a-d* may transmit UL MU PPDUs to the AP 102 simultaneously during a given UL time interval. For example, by using UL MU OFDMA techniques during a given UL time interval, multiple STAs 104*a-d* may transmit UL MU PPDUs to AP 102 via different respective OFDMA resource units (RUs) allocated by AP 102. In another example, by using UL MU multiple-input multiple-output (MU-MIMO) techniques during a given UL time interval, multiple STAs 104*a-d* may transmit UL MU PPDUs to the AP 102 via different respective spatial streams allocated by the AP 102.

To manage access, the AP 102 may transmit a HEW master-sync transmission, which may be a trigger frame (TF) or a control and schedule transmission, at the beginning of the control period. The AP 102 may transmit a time duration of the TXOP and sub-channel information. During the HEW control period, HEW STAs 104 *a, b, d* may communicate with the AP 102 in accordance with a non-contention based multiple access technique such as OFDMA or MU-MIMO. This HEW technique is unlike conventional WLAN communications in which devices communicate in accordance with a contention-based communication technique, rather than a multiple access technique. During the HEW control period, the AP 102 may communicate with stations 104 using one or more control frames, and the STAs 104 may operate on a sub-channel smaller than the operating range of the AP 102. Also, during the control period, legacy stations may refrain from communicating by entering a deferral period.

During the HEW master-sync transmission, the STAs 104 may contend for the wireless medium with the legacy devices 106 being excluded from contending for the wireless medium during the HEW master-sync transmission. The trigger frame used during this HEW master-sync transmission may indicate an UL-MU-MIMO and/or UL OFDMA control period. The multiple-access technique used during the control period may be a scheduled OFDMA technique, or alternatively, may be a TDMA technique, a frequency division multiple access (FDMA) technique, or a SDMA technique.

The AP 102 may also communicate with legacy stations and/or HEW stations 104 in accordance with legacy IEEE 802.11 communication techniques. In some configurations, the AP 102 may also be configurable to communicate with HEW stations 104 outside the HEW control period in accordance with legacy IEEE 802.11 communication techniques, although this is not a requirement.

Figure 1B:
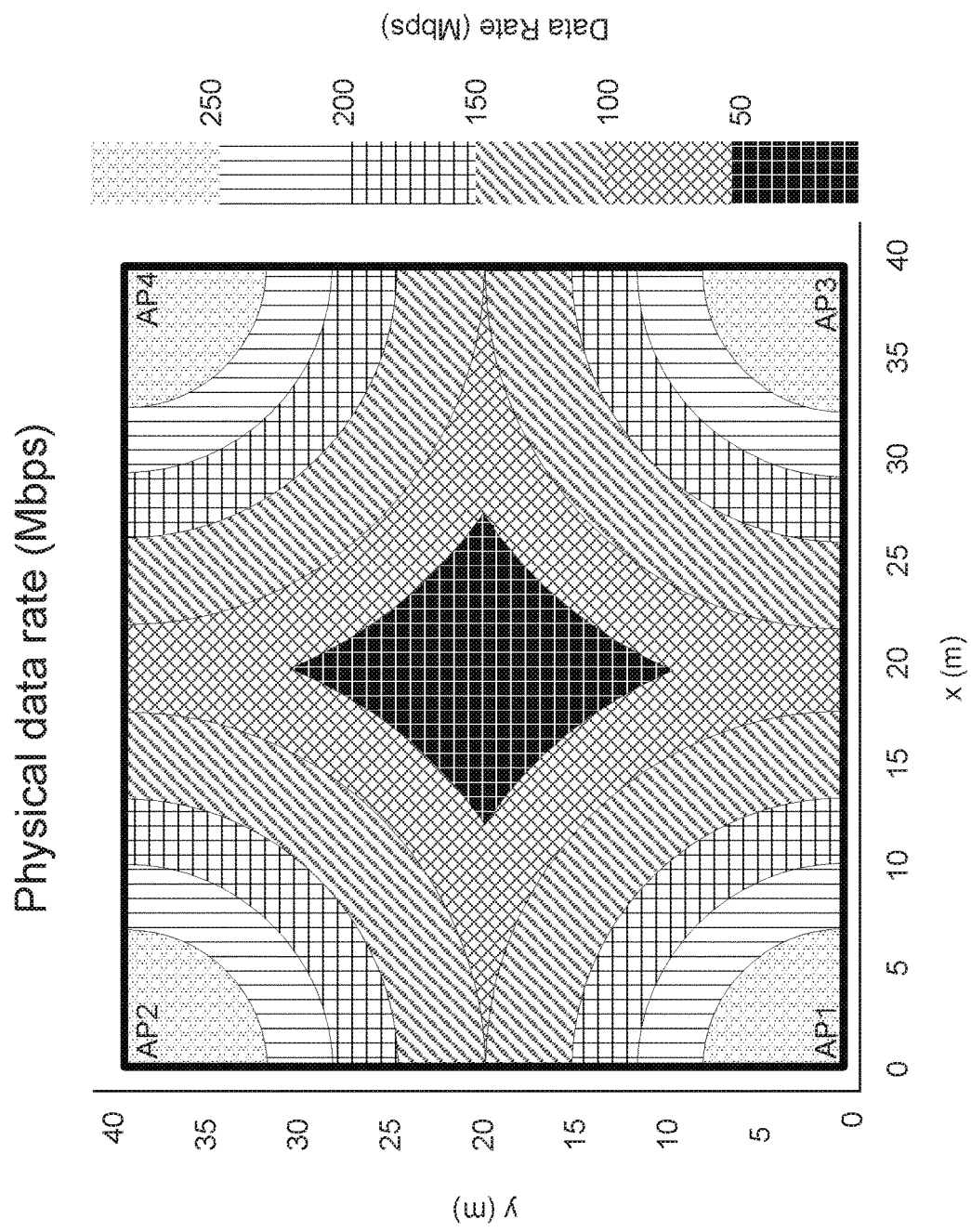
FIG. 1B illustrates a realized physical data rate for downlink for a STA based on location.
Figure 1C:
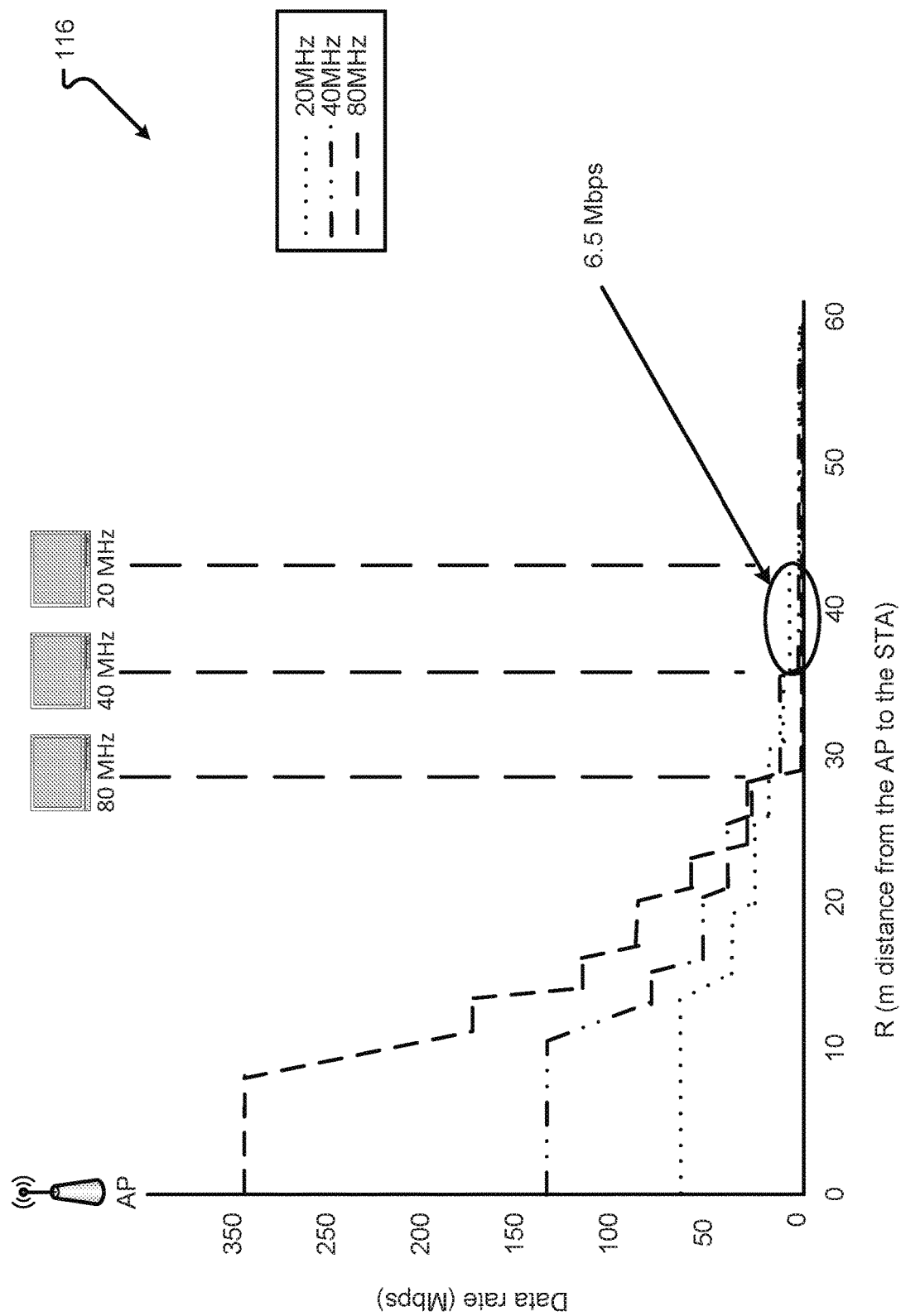
FIG. 1C illustrates a realized physical data rate from an AP to a CE STA or from the cell edge STA to the AP based on location with different channel bandwidth.

STA 104*d* represents a CE STA as STA 104*d* is at the edge of WLAN 103. The CE STA 104*d* may have a lower data throughput with AP 102 due to signal propagation issues. The chart 112 in FIG. 1B demonstrates, when a CE STA 104*d* is further from an AP (or multiple APs as shown in FIG. 1B), the physical data rate to/from the CE STA 104*d* drops. Another representation of the issues with data throughput with a CE STA 104*d* is shown in chart 116 provided in FIG. 1C. As shown in FIG. 1C, a CE STA 104*d* can be in range of a 20 MHz signal but not an 80 MHz signal. Likewise, with the increased transmission power of the AP 102, the CE STA 104*d* may be in range of the AP's 80 MHz signal but may not be able to send an 80 MHz signal to the AP 102. Data throughput can be increased for a CE STA 104*d* that can associate with multiple APs 102, as shown in FIG. 2.

Figure 2:
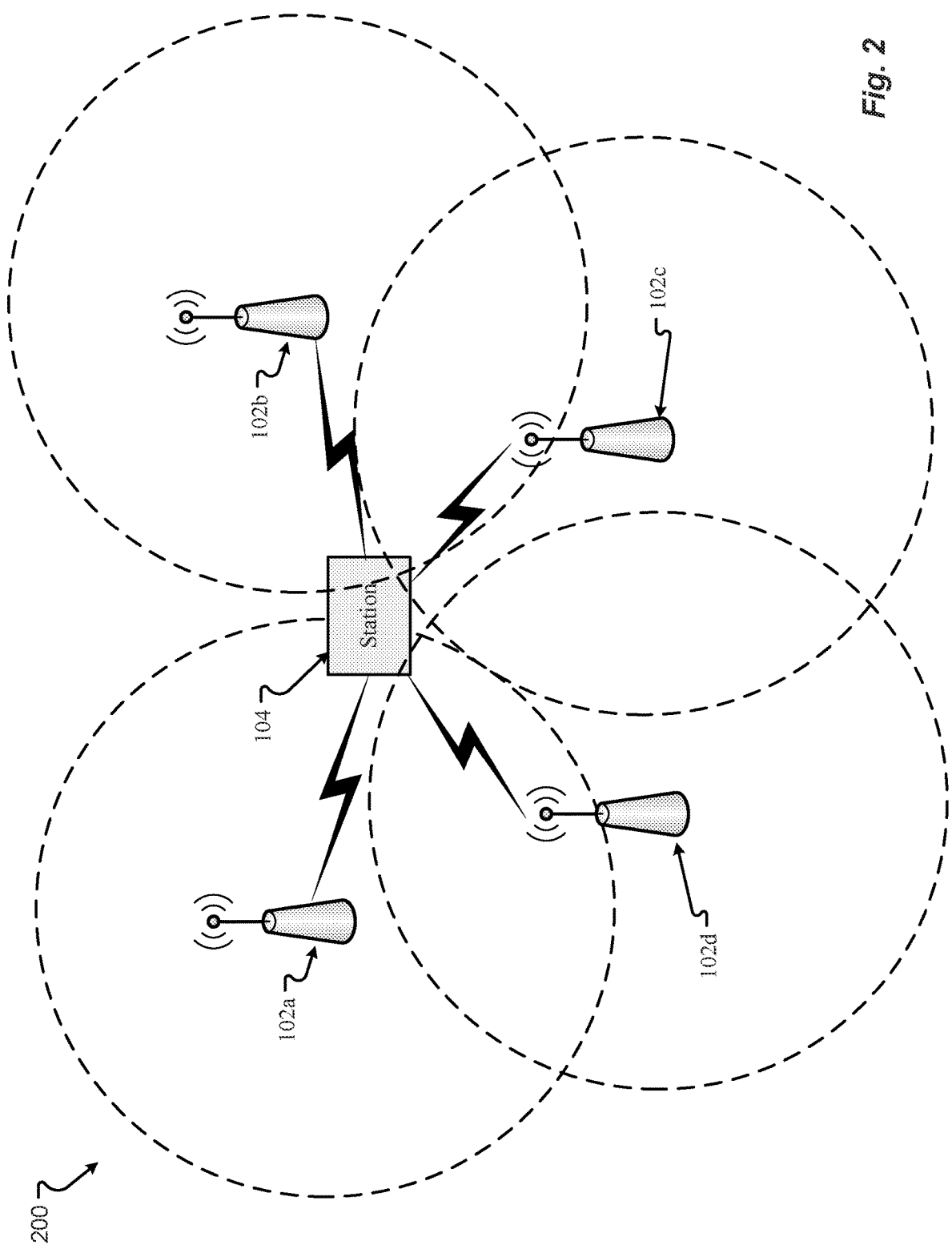
FIG. 2 illustrates another embodiment of an environment having a CE STA and multiple APs.

FIG. 2 illustrates an example of an environment 200 where a CE STA 104*d* can be associated with multiple APs 102*a*-102*d*. In this environment 200, as shown in FIG. 2, there are four APs 102*a*-102*d* that can be using the same 80 MHz channel. The APs 102 may be physically located at a distance from each other and from the CE STA 104*d*, for example, at the four corners of a large room.

Figure 3:
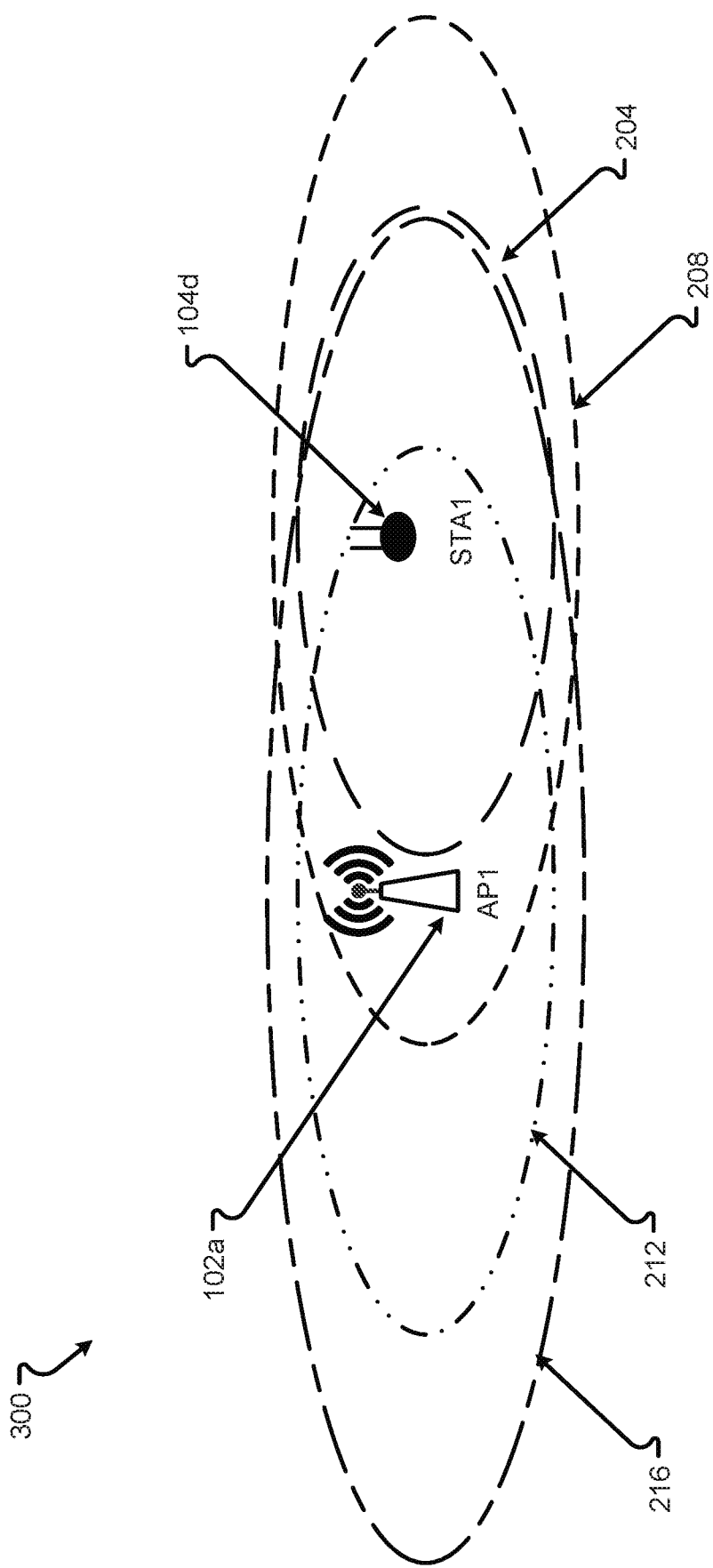
FIG. 3 illustrates another embodiment of an environment having a CE STA in 80 MHz range of the AP but where the AP is only in 20 MHz range of the CE STA.

Another example environment 300 is illustrated in FIG. 3. A CE STA 104*d* is in communication with the AP 102*a*. The CE STA 104*d* may have a possible range for transmissions over 80 MHz bandwidth represented by line 204. The CE STA 104*d* can also have a range for 20 MHz transmissions represented by line 208. Thus, the AP 102*a* is within range of the CE STA 104*d* for 20 MHz transmissions but not for 80 MHz transmissions.

Likewise, the AP 102*a* may have a possible range for transmissions over 80 MHz bandwidth, represented by line 212. With a higher power transmission, the AP 102*a* can have a greater range compared to the battery-powered CE STA 104*d*. The AP 102*a* can also have a range for 20 MHz transmissions represented by line 216. Thus, the AP 102*a* can send DL data to the CE STA 104*d* over either 80 MHz or 20 MHz bandwidth but cannot receive UL transmissions from the CE STA 104*d* over 80 MHz bandwidth.

Figure 4A:
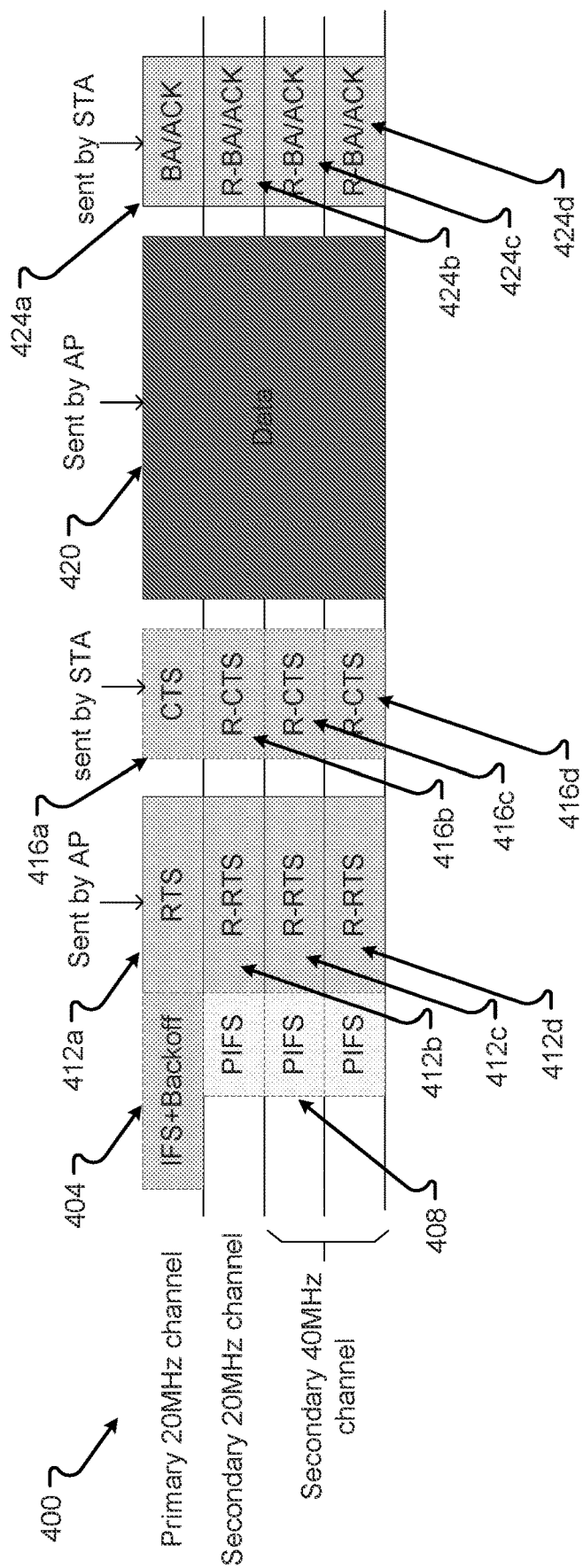
FIG. 4A illustrates an embodiment of a frame transmission sent/received between a CE STA and an AP.
Figure 4B:
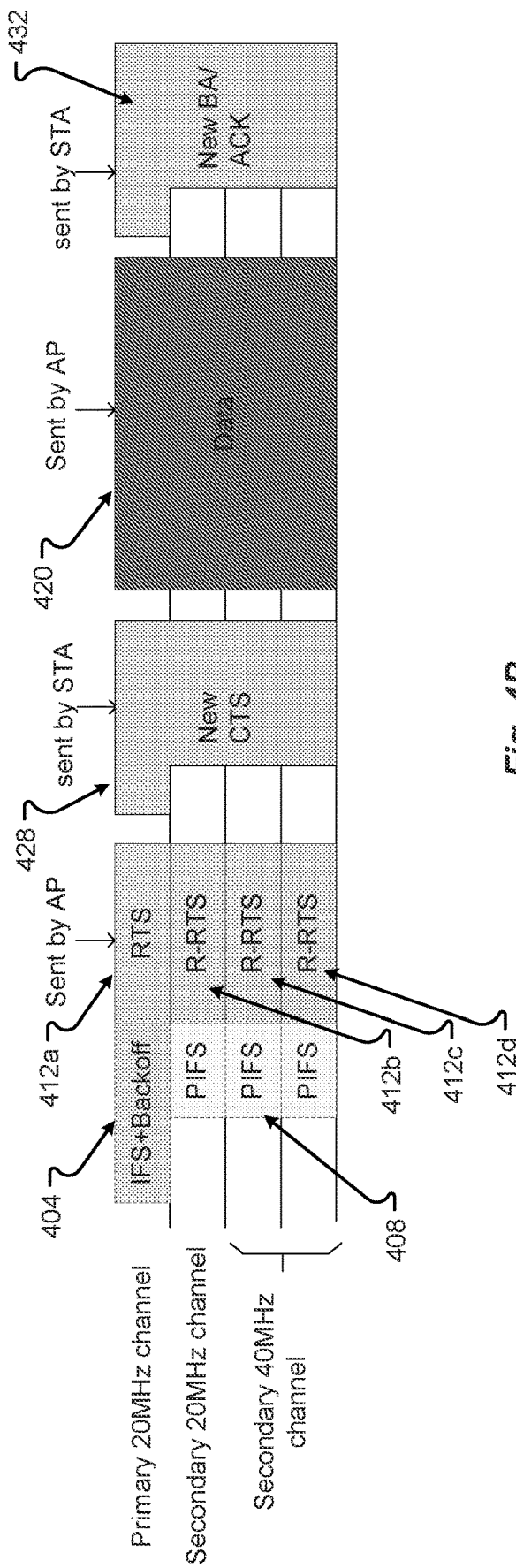
FIG. 4B illustrates an embodiment of a frame transmission sent/received between a CE STA and an AP.
Figure 4C:
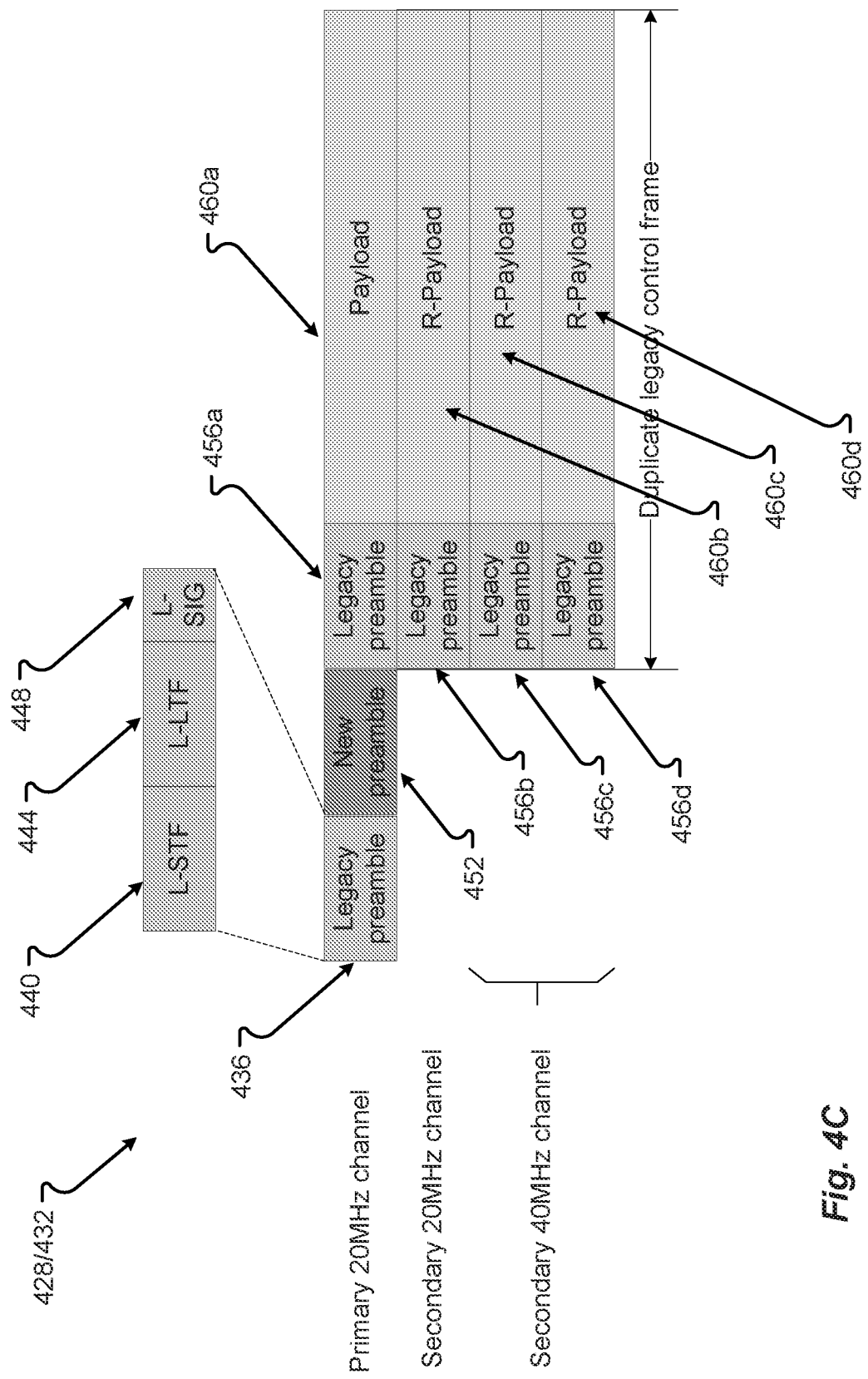
FIG. 4C illustrates an embodiment of a new CTS/acknowledgement ACK)/block ACK (BA) frame sent/received between a CE STA and an AP.

Frames and transmission procedures for providing 80 MHz DL data when the CE STA 104*d* cannot communicate to the AP 102*a* with 80 MHz bandwidth (the configuration shown in FIG. 3) may be as illustrated in FIGS. 4A through 4C. FIG. 4A shows the transmission process 400 when the CE STA 104*d* is within 80 MHz range. In this configuration, the AP 102*a* may have DL data for the CE STA 104*d*. When the AP 102*a* has a DL data packet for a STA 104*d*, the AP 102*a* can perform a clear channel assessment (CCA) over the 80 MHz channel. If the primary channel is idle for Inter-Framing Spacing (IFS) (also referred to as Interframe Space) 404 plus the backoff counter duration, and all the secondary 20 MHz channels are idle for Point Coordination Function (PCF) Inter-Frame Spacing (PIFS) (also referred to as the PCF Interframe Space) that precedes the expiration of the backoff counter, the AP 102*a* can send a duplicate RTS frames 412*a*-412*d* over the 80 MHz channel to the CE STA 104*d* and wait for the CTS 416*a* from the CE STA 104*d*.

If the AP 102*a* is not within 80 MHz transmission range of the CE STA 104*d*, the AP 102*a* will not receive the duplicate CTS frames 416*a*-416*d*. As such, the CTS frames 416 provided in FIG. 4A will not be as shown. The determination of these range issues with the CE STA 104*d* can be determined in earlier communications between the CE STA 104*d* and the AP 102*a*. As such, the CE STA 104*d* may send a new CTS to the AP 102*a* as shown in FIG. 4B.

Following the 802.11ac specification or other 802.11 protocol, the CE STA 104*d* may be monitoring the CCA prior to the reception of the RTS 412 frame. If the CE STA 104*d* does not detect interference on all secondary channels during PIFS 408 prior to the reception of the duplicate RTS frames 412, the CE STA 104*d* can respond to the AP 102*a* with a CTS frame 416/428 with one of the following two formats based on whether the CE STA 104*d* can reach the AP 102*a* with a wide bandwidth signal (an 80 MHz signal).

If the CE STA 104*d* can reach the AP 102*a* with wide bandwidth signal, the CE STA 104*d* transmits duplicate legacy CTS frames 416*a*-416*d* within the entire 80 MHz channel as shown in FIG. 4A. If the CE STA 104*d* cannot reach the AP 102*a* with a 40 or 80 MHz signal, the CE STA 104*d* transmits the new CTS frame 428 with the new frame format, as provided in FIGS. 4B and 4C.

Upon the detection of a packet, around the Short IFS (SIFS) time, after the end of RTS frame transmission 412, the AP 102*a* can identify whether the new control frame 428 has been sent by detecting the new preamble 452 following the legacy preamble 436. If the AP 102*a* receives the duplicated CTS 416a-416d, the AP 102a can send the DL data packet 420 to the CE STA 104d, over the 80 MHz channel, as shown in FIG. 4A, and wait for the acknowledgement (ACK) or Block ACK (BA) 424a-424d shown in FIG. 4A.

However, if the AP 102a receives the new CTS frame 428, the AP 102a can combine and decode, in frequency domain, the duplicate frames 428, following the new preamble 452, within the bandwidth indicated in the new preamble 452. In other words, the new preamble 452 indicates in which bandwidth the AP 102a should send data (which channels should be used), and the AP 102a can then decode the preambles 456a-456d in those channels. If the AP 102a receives the new CTS frame 428, the AP 102a will send the DL data packet 420 to the CE STA 104d over the bandwidth indicated in the CTS frames 456a-456d and wait for the acknowledgement (ACK) or Block ACK (BA) 432.

Upon successful reception of the data frame 420 from the AP 102a, the CE STA 104d can feedback the BA or ACK frame 424/432 with one of the two formats based on whether the CE STA 104d can reach the AP 102a with wide bandwidth signal, similar to what is described above with the CTS frames 416/428. Thus, the frame format 428/432 shown in FIG. 4C may apply to both the CTS frame 428 and the ACK or BA frame 432 shown in FIG. 4B.

As shown in FIG. 4C, the new CTS frame 428 and/or new ACK/BA frame 432 can include a legacy preamble 436. The legacy preamble 436 can include the Legacy-Short Training Field (L-STF) 440, the Legacy-Long Training Field (L-LTF) 444, and Legacy-Signal (L-SIG) field 448. The L-STF 440, L-LTF 444, and the L-SIG 448 may be as known in the art and/or as defined by one or more 802.11 specifications. The legacy preamble 436 may be transmitted only over the primary 20 MHz channel, this primary channel transmission, as shown in FIG. 4C, enables the AP 102a to detect the new control frame packet 428/432 because the signal-to-noise ratio (SNR) is 6 dB higher than an 80 MHz signal and 3 dB higher than a 40 MHz signal.

The AP 102a then can identify the new control frame packet 428/432 by detecting the presence of the new preamble 452 following the legacy preamble 436. There may be various data within the new preamble 452, some of which may be as described above. For example, the new preamble 452 can indicate in which channels of the 80 MHz or 40 MHz bandwidth the CE STA 104d is prepared to receive data by indicating those channels in the new preamble 452. Regardless, the presence of the new preamble 452 alone can indicate to the AP 102a that the signal includes a new control frame packet 428/432. If the AP 102a detects that the signal is a new control frame packet 428/432, the AP 102a can combine the processing of the duplicate control frames 456/460 that follow the new preamble 452 within the channel bandwidth indicated in the new preamble 452.

The duplicate legacy control packets 456/460 can include the legacy preamble 456 and the payload 460 of the control frame (e.g., the CTS or the ACK/BA). Both the legacy preamble 456 and/or the payload 460 may be duplicated over each 20 MHz channel within the total bandwidth that is indicated in the new preamble 452. This duplication enables a third-party STA 104a-104c, which are operating over the AP's secondary channels as their primary channels, to set their NAV for the AP's secondary channels. The duplication also enables the AP 102a to combine the duplicate legacy control frames 456/460, in frequency domain, to compensate for the 6 dB SNR loss with the four 20 MHz duplicate transmissions over the 80 MHz channel.

Figure 5:
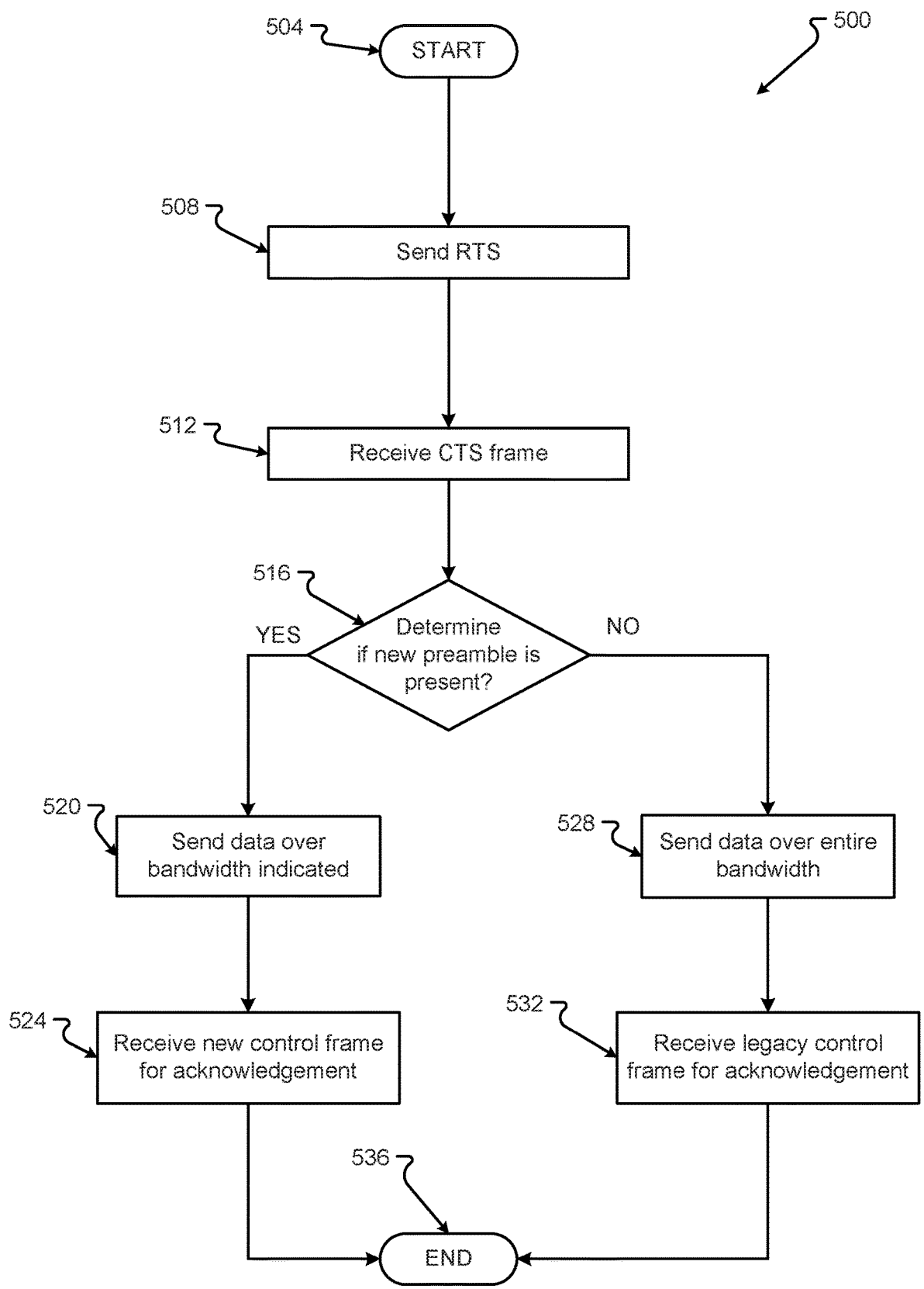
FIG. 5 is a flowchart outlining an exemplary technique for using an improved RTS/CTS process for transmitting 80 MHz data.

The process 500, conducted by the AP 102a, may be as shown in FIG. 5. A general order for the steps of the methods 500 is shown in FIG. 5. Generally, the method 500 starts with a start operation 504 and ends with operation 536. The method 500 can include more or fewer steps or can arrange the order of the steps differently than those shown in FIG. 5. The method 500 can be executed as a set of computer-executable instructions executed by a computer system or processor and encoded or stored on a computer readable medium. Hereinafter, the method 500 shall be explained with reference to the systems, components, circuits, modules, software, data structures, signalling processes, etc. described in conjunction with FIGS. 1-4C and 7.

A controller 720 (see FIG. 7) of an AP 102a may receive data from a data source, e.g., a third-party computer system in communication with the AP 102a over a network. The received data is to be downloaded to the CE STA 104d. For transmitting the DL data to the CE STA 104d, the AP 102a can perform a CCA over the 80 MHz channel. If the primary channel is idle, for the IFS 404 plus the backoff counter duration, and all the secondary 20 MHz channels are idle for PIFS 408 that precedes the expiration of the backoff counter, the wireless radio 770 (see FIG. 7) of the AP 102a can send a duplicate RTS frames 412a-412d over the 80 MHz channel to the CE STA 104d, in step 508. The RTS frames 412a-412d may be as described in conjunction with FIGS. 4A-4C. In at least some configurations, the RTS frames 412a-412 are as defined in one or more 802.11 specifications. The AP 102a can then wait for the CTS 416a from the CE STA 104d.

In step 512, the AP 102a can receive a CTS frame. The CTS frame can have one of two formats. If the CE STA 104d is able to reply over the 80 MHz channel, the AP 102a may receive CTS frame(s) 416, as described in conjunction with FIG. 4A. However, if the AP 102a is not within transmission range of the 80 MHz signal of the CE STA 104d, the AP 102a may receive the CTS frame(s) 428. As such, the AP 102a can determine which of the two types of CTS frame(s) 416/428 is received by determining if the received CTS 416/428 includes the new preamble 452, in step 516.

After receiving the CTS frame(s) 416/428 at the wireless radio 770, the controller 720 may determine whether the new preamble 452 is present in the CTS frame(s) 416/428. The controller 720 can receive the CTS frames 416 from the wireless radio 770 and determine that no new preamble 452 is present. In this case, the method 500 proceeds "NO" to step 528.

In contrast, the wireless radio 770 may receive a 20 MHz signal over the primary channel, which can have a 6 dB better SNR compared to an 80 MHz signal sent from the CE STA 104d. This initial signal can include the legacy preamble 436, which includes the training fields 440, 444 and signal fields 448, that comprise the initial response to the controller 720 from the CE STA 104d. Then, the controller 720 can receive the new preamble 452. The presence of the new preamble indicates to the controller 720 of the AP 102a that the CE STA 104d may receive DL data over a wide band channel but cannot provide the CTS frame(s) 416 as the AP 102a is out of range of the 80 MHz signal that may be sent from the CE STA 104d. The new preamble 452 can indicate that further legacy preambles 456a-456d will follow the new preamble 452 over the wide band channel. The payload 460a-460d can then include any CTS signalling needed beyond the information in the preambles 456. The legacy preambles 456a-456d and/or the CTS payloads 460 may be combined by the controller 720 and analysed in the frequency domain to adjust or compensate from weaker signal strength of the wide band signal from the CE STA 104*d*. If the new preamble 452 is present, the method 500 proceeds YES to step 520.

In both steps 520 and 528, the controller 720 generates the DL data 420, 460 for transmission over the wide band channel. The wireless data 420, 460 is sent by the wireless radio 770 as a wide band channel signal (e.g., a 40 MHz or 80 MHz signal) to the CE ST 104*d*, which is in transmission range of the wide band signal from the AP 102*a*. The AP 102*a* can then wait for the acknowledgement of the signal.

In step 532, the wireless radio 770 of the AP 102*a* can receive the legacy BA/ACK 424 over the wideband channel. The BA/ACK 424 can be as described hereinbefore or, in the least, as described in one or more 802.11 specifications.

The wireless radio 770 can receive BA/ACK 432 if the CE STA 104*d* is not within 80 MHz range, in step 524. As with the CTS frame(s) 428, the wireless radio 770 may receive the BA/ACK 432 as a 20 MHz signal over the primary channel, which can have a 6 dB better SNR compared to an 80 MHz signal sent from the CE STA 104*d*. This initial signal can include the legacy preamble 436, which includes the training fields 440, 444 and signal fields 448, that comprise the initial response to the controller 720 from the CE STA 104*d*. Then, the controller 720 can receive the new preamble 452. The presence of the new preamble indicates to the controller 720 of the AP 102*a* that the CE STA 104*d* received the DL data over the wide band channel but cannot provide the BA/ACK 424 as the AP 102*a* is out of range of the 80 MHz signal that may be sent from the CE STA 104*d*. The new preamble 452 can indicate that further legacy preambles 456*a*-456*d* will follow the new preamble 452 over the wide band channel. Further, the BA/ACK signals will be included in the payload 460 of the wideband signal from the CE STA 104*d*. The legacy preambles 456*a*-456*d* and/or BA/ACK signals 460 may be combined by the controller 720 and analysed in the frequency domain to adjust or compensate from the weaker signal strength of the wide band signal from the CE STA 104*d*. The signalling process 500 thereinafter ends with end operation 536.

Figure 6:
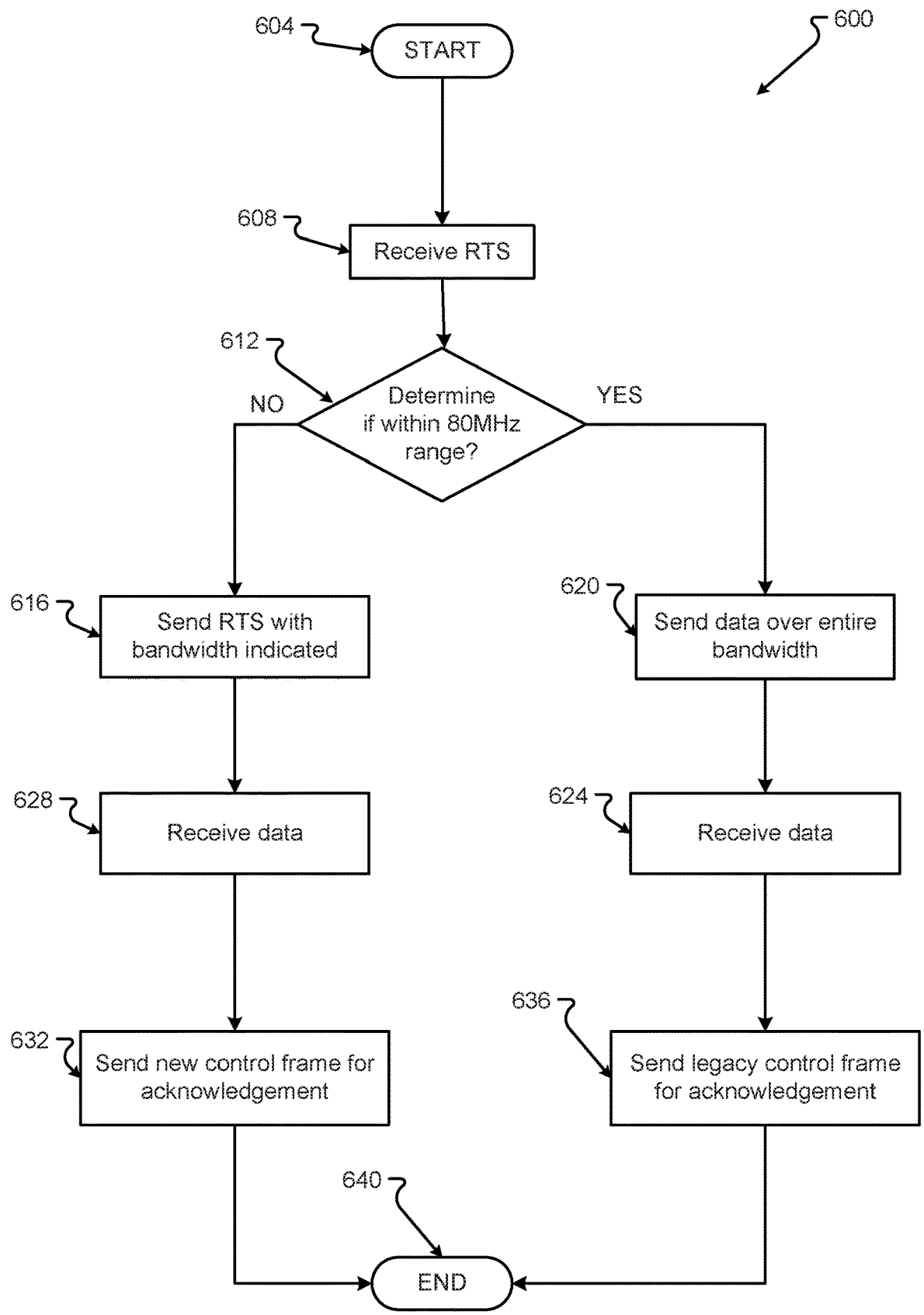
FIG. 6 is a flowchart outlining another exemplary technique for using an improved RTS/CTS process for transmitting 80 MHz data.

The process 600, conducted by the CE STA 104*d*, may be as shown in FIG. 6. A general order for the steps of the method 600 is shown in FIG. 6. Generally, the method 600 starts with a start operation 604 and ends with operation 636. The method 600 can include more or fewer steps or can arrange the order of the steps differently than those shown in FIG. 6. The method 600 can be executed as a set of computer-executable instructions executed by a computer system or processor and encoded or stored on a computer readable medium. Hereinafter, the method 600 shall be explained with reference to the systems, components, circuits, modules, software, data structures, signalling processes, etc. described in conjunction with FIGS. 1-5 and 7.

A wireless radio 770 of the CE STA 104*d* can receive duplicate RTS frame(s) 412*a*-412*d* over the 80 MHz channel from an AP 102*a*, in step 508. The RTS frames 412*a*-412*d* may be as described in conjunction with FIGS. 4A-4C. In at least some configurations, the RTS frames 412*a*-412 are as defined in one or more 802.11 specifications. The CE STA 104*d* can then determine whether to send a CTS frame 416 or a CTS frame 428 with a new preamble 452.

In step 612, the CE STA 104*d* can determine if the AP 102*a* is within the 80 MHz transmission range of the CE STA 104*d*. The CE STA 104*d* may know whether the AP 102*a* is within the transmission range from previous signalling or based on information collected or received when joining the BSS 100. In other situations, the CE STA 104*d* may determine if the AP 102 is within the transmission range based on analysis of the received RTS frames 412. There may be other methods for the CE STA 104*d* to determine whether the AP 102*a* is within the transmission range of the CE STA's wideband signal. Regardless, if the AP 102*a* is within the transmission range, the method 600 proceeds YES to step 620. If the AP 102*a* is not within the transmission range, the method 600 proceeds NO to step 516.

As such, the CE STA 104*d* can generate a CTS frame 416/428. The CTS frame can have one of two formats. If the CE STA 104*d* is able to reply over the 80 MHz channel, the controller of the CE STA 104*d* can generate CTS frame(s) 416, and the wireless radio 770 of the CE STA 104*d* can send the CTS frame(s) 416 to the AP 102*a*, in step 516, as described in conjunction with FIG. 4A. The CTS frame(s) 416 do not include the new preamble 452 and are sent over the wideband channel.

However, if the AP 102*a* is not within the transmission range of the 80 MHz signal of the CE STA 104*d*, the controller 720 of the CE STA 104*d* may generate the CTS frame(s) 428. The wireless radio 770 of the CE STA 104*d* can then send the CTS frame 428 to the AP 102*a*, in step 520. The CTS frame 428 does include the new preamble 452. Further, the wireless radio 770 can send the CTS frame 428 as a 20 MHz signal over the primary channel, which can have a 6 dB higher SNR compared to an 80 MHz signal sent from the CE STA 104*d*. This initial signal can include the legacy preamble 436, which includes the training fields 440, 444 and signal fields 448, that comprise the initial response of the controller 720 of the CE STA 104*d* to the AP 102*a*. Then, the CTS frame 428 can also include the new preamble 452. The presence of the new preamble indicates to the AP 102*a* that the controller 720 of the CE STA 104*d* can receive DL data over a wideband channel but cannot provide the CTS frame(s) 416 as the AP 102*a* is out of the transmission range of the 80 MHz signal that may be sent from the CE STA 104*d*. The new preamble 452 can indicate that further legacy preambles 456*a*-456*d* will follow the new preamble 452 over the wideband channel. The payload 460*a*-460*d* can then include any CTS signaling needed beyond the information in the preambles 456. The legacy preambles 456*a*-456*d* and/or the CTS payloads 460 may then be sent over the wideband channel by the wireless radio 770 of the CE STA 104*d*.

In both steps 624 and 628, the wireless radio 770 and then the controller 720 of the CE STA 104*d* receives the DL data 420, 460 over the wide band channel. The wireless data 420, 460 is received by the wireless radio 770 as a wideband channel signal (e.g., a 40 MHz or 80 MHz signal) at the CE ST 104*d*, which is in the transmission range of the wideband signal from the AP 102*a*. The CE STA 104*d* can then generate the acknowledgement of the data signal.

In step 632, the controller 720 of the CE STA 104*d* can generate the legacy BA/ACK 424 for transmission over the wideband channel. The BA/ACK 424 can be as described hereinbefore or, in the least, as described in one or more 802.11 specifications. The wireless radio 770 of the CE STA 104*d* may then send the legacy BA/ACK 424, in step 536, as a wideband signal.

The controller 720 of the CE STA 104*d* can generate the BA/ACK 432 if the CE STA 104*d* is not within the 80 MHz transmission range of the AP 102*a*, in step 624. As with the CTS frame(s) 428, the wireless radio 770 of the CE STA 104*d* may send the BA/ACK 432 as a 20 MHz signal over the primary channel, which can have a 6 dB higher SNR compared to an 80 MHz signal sent from the CE STA 104*d*. This initial signal can include the legacy preamble 436, which includes the training fields 440, 444 and signal fields 448, that comprise the initial response from the controller 720 of the CE STA 104d. Then, the controller 720 can send the new preamble 452. The presence of the new preamble 452 indicates to the controller 720 of the AP 102a that the CE STA 104d received the DL data over the wideband channel but cannot provide the BA/ACK frames 424 as the AP 102a is out of the transmission range of the 80 MHz signal that may be sent from the CE STA 104d. The new preamble 452 can indicate that further legacy preambles 456a-456d will follow the new preamble 452 over the wide band channel. Further, the BA/ACK signals 432 will be included in the payload 460 of the wideband signal from the CE STA 104d. The signalling process 600 thereinafter ends with end operation 640.

Figure 7:
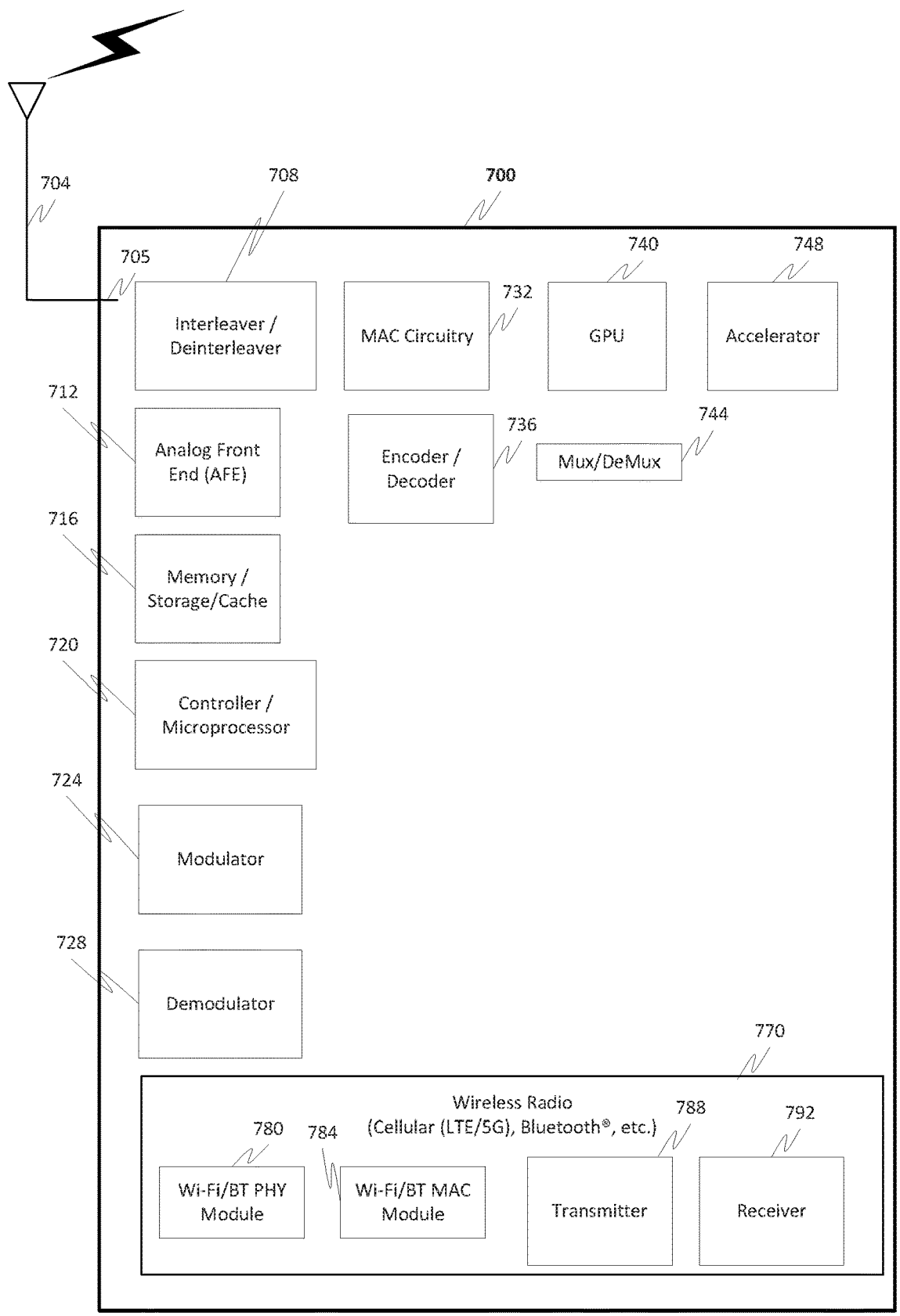
FIG. 7 is an illustration of the hardware/software associated with a CE STA and/or AP.

FIG. 7 illustrates an exemplary hardware diagram of a device 700, such as AP 102 and/or STAs 104, or the like, that is adapted to implement the technique(s) discussed herein. In addition to well-known componentry (which has been omitted for clarity), the device 700 includes interconnected elements including one or more of: one or more antennas 704, an interleaver/deinterleaver 708, an analog front end (AFE) 712, memory/storage/cache 716, controller/microprocessor 720, MAC circuitry 732, modulator 724, demodulator 728, encoder/decoder 736, GPU 740, accelerator 748, a multiplexer/demultiplexer 744, and wireless radio 770 components such as a Wi-Fi PHY module/circuit 780, a Wi-Fi/BT MAC module/circuit 784, transmitter 788 and receiver 792. The various elements in the device 700 are connected by one or more links/connections (not shown, again for sake of clarity).

The device 700 can have one more antennas 704, for use in wireless communications such as Wi-Fi, multi-input multi-output (MIMO) communications, multi-user multi-input multi-output (MU-MIMO) communications Bluetooth®, LTE, 5G, 60 Ghz, WiGig, mmWave systems, etc. The antenna(s) 704 can include, but are not limited to one or more of directional antennas, omnidirectional antennas, monopoles, patch antennas, loop antennas, microstrip antennas, dipoles, and any other antenna(s) suitable for communication transmission/reception. In one exemplary embodiment, transmission/reception using MIMO may require particular antenna spacing. In another exemplary embodiment, MIMO transmission/reception can enable spatial diversity allowing for different channel characteristics at each of the antennas. In yet another embodiment, MIMO transmission/reception can be used to distribute resources to multiple users.

Antenna(s) 704 generally interact with the Analog Front End (AFE) 712, which is needed to enable the correct processing of the received modulated signal and signal conditioning for a transmitted signal. The AFE 712 can be functionally located between the antenna and a digital baseband system in order to convert the analog signal into a digital signal for processing, and vice-versa.

The device 700 can also include a controller/microprocessor 720 and a memory/storage/cache 716. The device 700 can interact with the memory/storage/cache 716 which may store information and operations necessary for configuring and transmitting or receiving the information described herein. The memory/storage/cache 716 may also be used in connection with the execution of application programming or instructions by the controller/microprocessor 720, and for temporary or long term storage of program instructions and/or data. As examples, the memory/storage/cache 720 may comprise a computer-readable device, RAM, ROM, DRAM, SDRAM, and/or other storage device(s) and media.

The controller/microprocessor 720 may comprise a general purpose programmable processor or controller for executing application programming or instructions related to the device 700. Furthermore, the controller/microprocessor 720 can cooperate with one or more other elements in the device 700 to perform operations for configuring and transmitting information as described herein. The controller/microprocessor 720 may include multiple processor cores, and/or implement multiple virtual processors. Optionally, the controller/microprocessor 720 may include multiple physical processors. By way of example, the controller/microprocessor 720 may comprise a specially configured Application Specific Integrated Circuit (ASIC) or other integrated circuit, a digital signal processor(s), a controller, a hardwired electronic or logic circuit, a programmable logic device or gate array, a special purpose computer, or the like.

The device 700 can further include a transmitter 788 and receiver 792 which can transmit and receive signals, respectively, to and from other wireless devices and/or access points using the one or more antennas 704. Included in the device 700 circuitry is the medium access control or MAC Circuitry 732. MAC circuitry 732 provides for controlling access to the wireless medium. In an exemplary embodiment, the MAC circuitry 732 may be arranged to contend for the wireless medium and configure frames or packets for communicating over the wireless medium.

The device 700 can also optionally contain a security module (not shown). This security module can contain information regarding but not limited to, security parameters required to connect the device to an access point or other device, or vice versa, or other available network(s), and can include WEP or WPA/WPA-2 (optionally+AES and/or TKIP) security access keys, network keys, etc. As an example, the WEP security access key is a security password used by Wi-Fi networks. Knowledge of this code can enable a wireless device to exchange information with the access point and/or another device. The information exchange can occur through encoded messages with the WEP access code often being chosen by the network administrator. WPA is an added security standard that is also used in conjunction with network connectivity with stronger encryption than WEP.

The exemplary device 700 can also include a GPU 740, an accelerator 748, multiplexer/demultiplexer 744, a Wi-Fi/BT/BLE PHY module 780 and a Wi-Fi/BT/BLE MAC module 784 that at least cooperate with one or more of the other components as discussed herein. In operation, exemplary behavior of a wireless system commences with the transmitter side of a communication system including, for example, two or more of the wireless devices 700.

The AP can send data packet to the cell edge STA over wide channel bandwidth, which can provide much higher physical data rate than the narrow channel bandwidth. The embodiments herein can be extended to the multiple-AP operation (described in U.S. patent application Ser. No. 15/278,739, which is incorporated herein by reference in its entirety for all that it teaches and for all purposes) where the cell edge STA can transmit a trigger frame with this new frame format to initiate DL data transmission from multiple APs over adjacent narrowband simultaneously, when the cell edge STA cannot reach the AP with wide channel bandwidth signal. In this case, the coordinated APs may need to sense the secondary channels as well to receive this new frame packet.

In the detailed description, numerous specific details are set forth in order to provide a thorough understanding of the disclosed techniques. However, it will be understood by those skilled in the art that the present techniques may be practiced without these specific details. In other instances, well-known methods, procedures, components and circuits have not been described in detail so as not to obscure the present disclosure.

Although embodiments are not limited in this regard, discussions utilizing terms such as, for example, "processing," "computing," "calculating," "determining," "establishing", "analysing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments are not limited in this regard, the terms "plurality" and "a plurality" as used herein may include, for example, "multiple" or "two or more". The terms "plurality" or "a plurality" may be used throughout the specification to describe two or more components, devices, elements, units, parameters, circuits, or the like. For example, "a plurality of stations" may include two or more stations.

It may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The exemplary embodiments are described in relation to communications systems, as well as protocols, techniques, means and methods for performing communications, such as in a wireless network, or in general in any communications network operating using any communications protocol(s). Examples of such are home or access networks, wireless home networks, wireless corporate networks, and the like. It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however that the present disclosure may be practiced in a variety of ways beyond the specific details set forth herein. Furthermore, while the exemplary embodiments illustrated herein show various components of the system collocated, it is to be appreciated that the various components of the system can be located at distant portions of a distributed network, such as a communications network, node, within a Domain Master, and/or the Internet, or within a dedicated secured, unsecured, and/or encrypted system and/or within a network operation or management device that is located inside or outside the network. As an example, a Domain Master can also be used to refer to any device, system or module that manages and/or configures or communicates with any one or more aspects of the network or communications environment and/or transceiver(s) and/or stations and/or access point(s) described herein.

Thus, it should be appreciated that the components of the system can be combined into one or more devices, or split between devices, such as a transceiver, an access point, a station, a Domain Master, a network operation or management device, a node or collocated on a particular node of a distributed network, such as a communications network. As will be appreciated from the following description, and for reasons of computational efficiency, the components of the system can be arranged at any location within a distributed network without affecting the operation thereof. For example, the various components can be located in a Domain Master, a node, a domain management device, such as a MIB, a network operation or management device, a transceiver(s), a station, an access point(s), or some combination thereof. Similarly, one or more of the functional portions of the system could be distributed between a transceiver and an associated computing device/system.

Furthermore, it should be appreciated that the various links 5, including the communications channel(s) connecting the elements, can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the exemplary embodiments described herein are directed toward a transmitter portion of a transceiver performing certain functions, or a receiver portion of a transceiver performing certain functions, this disclosure is intended to include corresponding and complementary transmitter-side or receiver-side functionality, respectively, in both the same transceiver and/or another transceiver(s), and vice versa.

The exemplary embodiments are described in relation to enhanced GFDM communications. However, it should be appreciated, that in general, the systems and methods herein will work equally well for any type of communication system in any environment utilizing any one or more protocols including wired communications, wireless communications, powerline communications, coaxial cable communications, fiber optic communications, and the like.

The exemplary systems and methods are described in relation to IEEE 802.11 and/or Bluetooth® and/or Bluetooth® Low Energy transceivers and associated communication hardware, software and communication channels. However, to avoid unnecessarily obscuring the present disclosure, the following description omits well-known structures and devices that may be shown in block diagram form or otherwise summarized.

Exemplary aspects are directed toward:

An access point (AP) comprising: a controller to: initiate a downlink (DL) data transmission to a cell-edge station (CE STA), wherein the CE STA cannot send a wideband channel signal to the wireless communication device; a wireless radio to: based on an indication from the controller that DL data is available to transmit to the CE STA, send a Ready-To-Send (RTS) frame over a wideband channel; in response to the RTS frame, receive a CTS frame from the CE STA; and the controller further to determine if the CE STA can receive data over the wideband channel.

The one or more above aspects, wherein the controller determines if the CE STA can receive data over the wideband channel based on a presence of a new preamble in the CTS frame.

The one or more above aspects, wherein the CTS frame with the new preamble is received only over the narrowband primary channel.

The one or more above aspects, wherein the new preamble is preceded by a legacy preamble.

The one or more above aspects, wherein the new preamble is succeeded by two or more other legacy preambles sent over two or more channels of the wideband channel.

The one or more above aspects, the controller further to: combine the two or more other legacy preambles and payload; and decode the combined legacy preambles and payload in the frequency domain.

The one or more above aspects, the controller further to send the DL data over the wideband channel.

The one or more above aspects, the wireless radio to receive an ACK/BA frame.

The one or more above aspects, wherein the ACK/BA frame also includes the new preamble.

The one or more above aspects, wherein the new preamble indicates in which channels the two or more other legacy preambles and payload will be received.

A method for sending data from an access point (AP) to a cell-edge station (CE STA), the method comprising: a controller of the AP initiating a downlink (DL) data transmission to the CE STA, wherein the CE STA cannot send a wideband channel signal to the wireless communication device; based on an indication from the controller that DL data is available to transmit to the CE STA, a wireless radio sending a Ready-To-Send (RTS) frame over a wideband channel; in response to the RTS frame, the wireless radio receiving a Clear-To-Send (CTS) frame from the CE STA; and the controller determining if the CE STA can receive data over the wideband channel.

The one or more above aspects, wherein the controller determines if the CE STA can receive data over the wideband channel based on a presence of a new preamble in the CTS frame.

The one or more above aspects, wherein the CTS frame with the new preamble is received only over the narrowband primary channel.

The one or more above aspects, wherein the new preamble is preceded by a legacy preamble.

The one or more above aspects, wherein the new preamble is succeeded by two or more other legacy preambles sent over two or more channels of the wideband channel.

The one or more above aspects, the method further comprising: the controller combining the two or more other legacy preambles and payload; and the controller decoding the combined legacy preambles and payload in the frequency domain.

The one or more above aspects, the method further comprising: the controller sending the DL data over the wideband channel.

The one or more above aspects, the method further comprising: the wireless radio receiving an ACK/BA frame.

The one or more above aspects, wherein the ACK/BA frame also includes the new preamble.

The one or more above aspects, wherein the new preamble indicates in which channels the two or more other legacy preambles and payload will be received.

A non-transitory computer readable medium having instructions stored thereon which cause a processor associated with an access point (AP) to conduct a method for sending data from the AP to a cell-edge station (CE STA), the method comprising: initiating a downlink (DL) data transmission to the CE STA, wherein the CE STA cannot send a wideband channel signal to the wireless communication device; based on an indication from the controller that DL data is available to transmit to the CE STA, directing a wireless radio to send a Ready-To-Send (RTS) frame over a wideband channel; in response to the RTS frame, receiving, from the wireless radio, a Clear-To-Send (CTS) frame sent from the CE STA; and determining if the CE STA can receive data over the wideband channel.

The one or more above aspects, the method further comprising determining if the CE STA can receive data over the wideband channel based on a presence of a new preamble in the CTS frame.

The one or more above aspects, wherein the CTS frame with the new preamble is received only over the narrowband primary channel.

The one or more above aspects, wherein the new preamble is preceded by a legacy preamble.

The one or more above aspects, wherein the new preamble is succeeded by two or more other legacy preambles sent over two or more channels of the wideband channel.

The one or more above aspects, the method further comprising: combining the two or more other legacy preambles and payload; and decoding the combined legacy preambles and payload in the frequency domain.

The one or more above aspects, the method further comprising: sending the DL data over the wideband channel.

The one or more above aspects, the method further comprising: receiving an ACK/BA frame.

The one or more above aspects, wherein the ACK/BA frame also includes the new preamble.

The one or more above aspects, wherein the new preamble indicates in which channels the two or more other legacy preambles and payload will be received.

A computing system comprising: a means for initiating a downlink (DL) data transmission to the CE STA, wherein the CE STA cannot send a wideband channel signal to the wireless communication device; based on an indication from the controller that DL data is available to transmit to the CE STA, a means for sending a Ready-To-Send (RTS) frame over a wideband channel; in response to the RTS frame, a means for receiving a Clear-To-Send (CTS) frame from the CE STA; and a means for determining if the CE STA can receive data over the wideband channel.

The one or more above aspects, further comprising a means for determining if the CE STA can receive data over the wideband channel based on a presence of a new preamble in the CTS frame.

The one or more above aspects, wherein the CTS frame with the new preamble is received only over the narrowband primary channel.

The one or more above aspects, wherein the new preamble is preceded by a legacy preamble.

The one or more above aspects, wherein the new preamble is succeeded by two or more other legacy preambles sent over two or more channels of the wideband channel.

The one or more above aspects, further comprising a means for: combining the two or more other legacy preambles and payload; and decoding the combined legacy preambles and payload in the frequency domain.

The one or more above aspects, further comprising a means for sending the DL data over the wideband channel.

The one or more above aspects, further comprising a means for receiving an ACK/BA frame.

The one or more above aspects, wherein the ACK/BA frame also includes the new preamble.

The one or more above aspects, wherein the new preamble indicates in which channels the two or more other legacy preambles and payload will be received.

A cell-edge station (CE STA) comprising: a wireless radio to: receive a Ready-To-Send (RTS) frame indicating that an access point (AP) has downlink (DL) data for transmission to the CE STA, wherein the CE STA cannot send a wideband channel signal to the AP; a controller to: receive the RTS frame from the wireless radio; determine if the CE STA can send a wideband signal to the AP; when the CE STA cannot send a wideband signal to the AP, generate a Clear-To-Send (CTS) frame include a new preamble that indicates that the CE STA can receive the DL data over a wideband transmission; and the wireless radio further to send the CTS frame to the AP.

The one or more above aspects, wherein the AP determines that the CE STA can receive data over the wideband channel based on a presence of the new preamble in the CTS frame.

The one or more above aspects, wherein the CTS frame with the new preamble is sent only over the narrowband primary channel.

The one or more above aspects, wherein the new preamble is preceded by a legacy preamble.

The one or more above aspects, wherein the new preamble is succeeded by two or more other legacy preambles sent over two or more channels of the wideband channel.

The one or more above aspects, the wireless radio further to receive the DL data over the wideband channel.

The one or more above aspects, the wireless radio to send an ACK/BA frame.

The one or more above aspects, wherein the ACK/BA frame also includes the new preamble.

The one or more above aspects, wherein the new preamble indicates in which channels the two or more other legacy preambles and payload will be received.

The one or more above aspects, wherein when the CE STA can send a wideband channel signal to the AP, the wireless radio to send two or more CTS frames, which do not include the new preamble, over two or more of the channels in the wideband channel.

A method for receiving data at a cell-edge station (CE STA) from an access point (AP), the method comprising: a wireless radio receiving a Ready-To-Send (RTS) frame indicating that an access point (AP) has downlink (DL) data for transmission to the CE STA, wherein the CE STA cannot send a wideband channel signal to the AP; a controller receiving the RTS frame from the wireless radio; the controller determining if the CE STA can send a wideband signal to the AP; when the CE STA cannot send a wideband signal to the AP, the controller generating a Clear-To-Send (CTS) frame include a new preamble that indicates that the CE STA can receive the DL data over a wideband transmission; and the wireless radio sending the CTS frame to the AP.

The one or more above aspects, wherein the AP determines that the CE STA can receive data over the wideband channel based on a presence of the new preamble in the CTS frame.

The one or more above aspects, wherein the CTS frame with the new preamble is sent only over the narrowband primary channel.

The one or more above aspects, wherein the new preamble is preceded by a legacy preamble.

The one or more above aspects, wherein the new preamble is succeeded by two or more other legacy preambles sent over two or more channels of the wideband channel.

The one or more above aspects, the method further comprising: the wireless radio receiving the DL data over the wideband channel.

The one or more above aspects, the method further comprising: the wireless radio sending an ACK/BA frame.

The one or more above aspects, wherein the ACK/BA frame also includes the new preamble.

The one or more above aspects, wherein the new preamble indicates in which channels the two or more other legacy preambles and payload will be received.

The one or more above aspects, wherein when the CE STA can send a wideband channel signal to the AP, the method further comprising: the wireless radio sending two or more CTS frames, which do not include the new preamble, over two or more of the channels in the wideband channel.

A non-transitory computer readable medium having instructions stored thereon which cause a processor associated with a cell-edge station (CE STA) to conduct a method for receiving data from an access point (AP) at the CE STA, the method comprising: receiving a Ready-To-Send (RTS) frame indicating that the AP has downlink (DL) data for transmission to the CE STA, wherein the CE STA cannot send a wideband channel signal to the AP; receiving the RTS frame from the wireless radio; determining if the CE STA can send a wideband signal to the AP; when the CE STA cannot send a wideband signal to the AP, generating a Clear-To-Send (CTS) frame include a new preamble that indicates that the CE STA can receive the DL data over a wideband transmission; and sending the CTS frame to the AP.

The one or more above aspects, wherein the AP determines that the CE STA can receive data over the wideband channel based on a presence of the new preamble in the CTS frame.

The one or more above aspects, wherein the CTS frame with the new preamble is sent only over the narrowband primary channel.

The one or more above aspects, wherein the new preamble is preceded by a legacy preamble.

The one or more above aspects, wherein the new preamble is succeeded by two or more other legacy preambles sent over two or more channels of the wideband channel.

The one or more above aspects, the method further comprising: receiving the DL data over the wideband channel.

The one or more above aspects, the method further comprising: sending an ACK/BA frame.

The one or more above aspects, wherein the ACK/BA frame also includes the new preamble.

The one or more above aspects, wherein the new preamble indicates in which channels the two or more other legacy preambles and payload will be received.

The one or more above aspects, wherein when the CE STA can send a wideband channel signal to the AP, the method further comprising: sending two or more CTS frames, which do not include the new preamble, over two or more of the channels in the wideband channel.

A computing system comprising: a means for receiving a Ready-To-Send (RTS) frame indicating that an access point (AP) has downlink (DL) data for transmission to the CE STA, wherein the CE STA cannot send a wideband channel signal to the AP; a means for receiving the RTS frame from the wireless radio; a means for determining if the CE STA can send a wideband signal to the AP; when the CE STA cannot send a wideband signal to the AP, a means for generating a Clear-To-Send (CTS) frame include a new preamble that indicates that the CE STA can receive the DL data over a wideband transmission; and a means for sending the CTS frame to the AP.

The one or more above aspects, wherein the AP determines that the CE STA can receive data over the wideband channel based on a presence of the new preamble in the CTS frame.

The one or more above aspects, wherein the CTS frame with the new preamble is sent only over the narrowband primary channel.

The one or more above aspects, wherein the new preamble is preceded by a legacy preamble.

The one or more above aspects, wherein the new preamble is succeeded by two or more other legacy preambles sent over two or more channels of the wideband channel.

The one or more above aspects, further comprising: a means for receiving the DL data over the wideband channel.

The one or more above aspects, further comprising: a means for sending an ACK/BA frame.

The one or more above aspects, wherein the ACK/BA frame also includes the new preamble.

The one or more above aspects, wherein the new preamble indicates in which channels the two or more other legacy preambles and payload will be received.

The one or more above aspects, wherein when the CE STA can send a wideband channel signal to the AP, further comprising: a means for sending two or more CTS frames, which do not include the new preamble, over two or more of the channels in the wideband channel.

A system on a chip (SoC) including any one or more of the above aspects.

One or more means for performing any one or more of the above aspects.

Any one or more of the aspects as substantially described herein.

For purposes of explanation, numerous details are set forth in order to provide a thorough understanding of the present embodiments. It should be appreciated however that the techniques herein may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a communications network and/or the Internet, or within a dedicated secure, unsecured and/or encrypted system. Thus, it should be appreciated that the components of the system can be combined into one or more devices, such as an access point or station, or collocated on a particular node/element(s) of a distributed network, such as a telecommunications network. As will be appreciated from the following description, and for reasons of computational efficiency, the components of the system can be arranged at any location within a distributed network without affecting the operation of the system. For example, the various components can be located in a transceiver, an access point, a station, a management device, or some combination thereof. Similarly, one or more functional portions of the system could be distributed between a transceiver, such as an access point(s) or station(s) and an associated computing device.

Furthermore, it should be appreciated that the various links, including communications channel(s), connecting the elements (which may not be not shown) can be wired or wireless links, or any combination thereof, or any other known or later developed element(s) that is capable of supplying and/or communicating data and/or signals to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

While the above-described flowcharts have been discussed in relation to a particular sequence of events, it should be appreciated that changes to this sequence can occur without materially effecting the operation of the embodiment(s). Additionally, the exact sequence of events need not occur as set forth in the exemplary embodiments, but rather the steps can be performed by one or the other transceiver in the communication system provided both transceivers are aware of the technique being used for initialization. Additionally, the exemplary techniques illustrated herein are not limited to the specifically illustrated embodiments but can also be utilized with the other exemplary embodiments and each described feature is individually and separately claimable.

The term transceiver as used herein can refer to any device that comprises hardware, software, circuitry, firmware, or any combination thereof and is capable of performing any of the methods, techniques and/or algorithms described herein.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software and/or firmware that can be stored on a storage medium to improve the performance of: a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that there has at least been provided systems and methods for enhanced communications. While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

The invention claimed is:

1. An access point (AP) comprising:
a controller to initiate a downlink (DL) data transmission to a cell-edge station (CE STA), wherein the CE STA cannot send a wideband channel signal to the AP; and
a transceiver configured to:
based on an indication from the controller that DL data is available to transmit to the CE STA, send a Ready-To-Send (RTS) frame over a wideband channel; and
in response to the RTS frame, receive a CTS frame from the CE STA over a narrowband primary channel,
wherein the controller is further to determine if the CE STA can receive data over the wideband channel based on a presence of a new preamble in the CTS frame, and
wherein the new preamble is preceded by a legacy preamble.

2. The AP of claim 1, wherein the new preamble is succeeded by two or more other legacy preambles sent over two or more channels of the wideband channel.

3. The AP of claim 2, the controller further to:
combine the two or more other legacy preambles and payload; and
decode the combined legacy preambles and payload in the frequency domain.

4. The AP of claim 3, the controller further to send the DL data over the wideband channel.

5. The AP of claim 4, the transceiver further configured to receive an ACK/BA frame.

6. The AP of claim 5, wherein the ACK/BA frame also includes the new preamble.

7. The AP of claim 6, wherein the new preamble indicates in which channels the two or more other legacy preambles and payload will be received.

8. A cell-edge station (CE STA) comprising:
a transceiver configured to:
receive a Ready-To-Send (RTS) frame indicating that an access point (AP) has downlink (DL) data for transmission to the CE STA, wherein the CE STA cannot send a wideband signal over a wideband channel to the AP;
a controller to:
receive the RTS frame from the transceiver;
determine if the CE STA can send the wideband signal to the AP; and
when the CE STA cannot send the wideband signal to the AP, generate a Clear-To-Send (CTS) frame include a new preamble that indicates that the CE STA can receive the DL data over the wideband channel,
wherein the new preamble is preceded by a legacy preamble,
wherein the transceiver is further configured to send the CTS frame with the new preamble to the AP over a narrowband primary channel, and
wherein a presence of the new preamble in the CTS frame indicates to the AP that the CE STA can receive data over the wideband channel.

9. The CE STA of claim 8, wherein the new preamble is succeeded by two or more other legacy preambles sent over two or more channels of the wideband channel.

10. The CE STA of claim 9, the transceiver further configured to receive the DL data over the wideband channel.

11. The CE STA of claim 10, the transceiver further configured to send an ACK/BA frame.

12. The CE STA of claim 11, wherein the ACK/BA frame also includes the new preamble.

13. The CE STA of claim 12, wherein the new preamble indicates in which channels the two or more other legacy preambles and payload will be received.

14. The CE STA of claim 13, wherein when the CE STA can send the wideband signal to the AP, the transceiver configured to send two or more CTS frames, which do not include the new preamble, over two or more of the channels in the wideband channel.

15. An apparatus of a cell-edge station (CE STA), the apparatus comprising: processing circuitry; and memory, wherein the processing circuitry is configured to:
decode a Ready-To-Send (RTS) frame indicating that an access point (AP) has downlink (DL) data for transmission to the CE STA;
determine whether the CE STA can send a wideband signal to the AP; and encode a Clear-To-Send (CTS) frame for transmission to the AP to include a new preamble when the CE STA is unable to send the wideband signal to the AP, the new preamble to indicate to the AP that the CE STA is able to receive the DL data over a wideband channel, the CTS frame encoded for transmission over a narrowband primary channel.

16. The apparatus of claim 15, wherein the processing circuitry is further configured to:

encode the CTS frame for transmission to the AP without the new preamble when the CE STA is able send the wideband signal to the AP, the CTS frame encoded for transmission over the wideband channel, the wideband channel comprising at least two or more narrowband channels including the narrowband primary channel.

17. The apparatus of claim 16, wherein the narrowband channels, including the narrowband primary channel are 20 MHz channels, and wherein the wideband channel comprises at least an 80 MHz channel.

18. The apparatus of claim 17, wherein the memory is configured to store the CTS frame.

* * * * *